United States Patent [19]

Kodera et al.

[11] 4,250,661

[45] Feb. 17, 1981

[54] AGRICULTURAL COVERING MULTILAYER FILM OR SHEET STRUCTURE AND METHOD FOR THERMAL INSULATION

[75] Inventors: Yoshiaki Kodera, Kusatsu; Kiyoyuki Watanabe, Jyoyo; Tetsuo Kadoya, Osaka; Tadashi Taguchi, Kyoto, all of Japan

[73] Assignee: Sekisui Kagaku Kogyo K.K., Japan

[21] Appl. No.: 68,965

[22] Filed: Aug. 23, 1979

Related U.S. Application Data

[62] Division of Ser. No. 911,955, Jun. 1, 1978.

[51] Int. Cl.$^3$ .............. A01G 9/00; B32B 5/18; B32B 27/42; A01G 9/24
[52] U.S. Cl. .............. 47/58; 47/17; 47/29; 47/DIG. 6; 428/501; 428/518; 428/520; 428/522; 428/524; 428/315; 521/136; 521/143; 525/154
[58] Field of Search .............. 428/501, 518, 520, 522, 428/524, 315; 521/136, 143; 525/154; 47/17, 29, 58, DIG. 6

[56] References Cited

U.S. PATENT DOCUMENTS

| | | | |
|---|---|---|---|
| 3,250,823 | 5/1966 | Zeitlin | 260/857 |
| 3,306,877 | 2/1967 | Schott | 260/67 |
| 3,476,832 | 11/1969 | Pritchard | 260/887 |
| 3,635,876 | 1/1972 | Chameroy | 260/37 |
| 3,738,956 | 6/1973 | Glatti | 47/17 |
| 3,980,734 | 9/1976 | Burg | 260/897 |
| 4,075,784 | 2/1978 | Pied | 47/17 |

FOREIGN PATENT DOCUMENTS

| | | | |
|---|---|---|---|
| 245696 | 7/1960 | Australia | 260/897 |
| 731239 | 3/1966 | Canada | 260/897 |
| 47-9260 | 3/1972 | Japan | 428/501 |
| 47-13853 | 4/1972 | Japan . | |
| 52-105953 | 9/1977 | Japan . | |
| 1006226 | 9/1965 | United Kingdom | 428/501 |
| 1014016 | 12/1965 | United Kingdom | 525/154 |

*Primary Examiner*—Ellis P. Robinson
*Attorney, Agent, or Firm*—Wenderoth, Lind & Ponack

[57] ABSTRACT

A covering multilayer film or sheet structure for agricultural application, which consists essentially of:

(1) a film or sheet of a resin composition comprising (A) 100 parts by weight of a thermoplastic resin selected from the group consisting of olefinic resins and vinyl chloride resins and (B) about 1 to about 40 parts by weight of an acetal resin, and (2) a layer of the thermoplastic resin (A) laminated to at least one surface of the film or sheet (1); and a method for maintaining an agricultural locus at temperatures suitable for the growth of plants, using aforesaid covering multilayer film or sheet.

4 Claims, No Drawings

AGRICULTURAL COVERING MULTILAYER FILM OR SHEET STRUCTURE AND METHOD FOR THERMAL INSULATION

This is a division of application Ser. No. 911,955, filed June 1, 1978.

This invention relates to an agricultural covering multilayer film or sheet structure for maintaining a particular agricultural locus at temperatures suitable for the growth of plants, especially crops; and to a method for thermally insulating the agricultural locus using such a multilayer film or sheet structure.

Various synthetic resin films or sheets (including foamed ones) have been utilized heretofore as agricultural covering films or sheets, for example in agricultural (the term is meant to include "horticultural") houses and tunnel houses, or in mulching. The present invention pertains to a multilayer film or sheet structure especially suitable as such as agricultural covering film or sheet for thermally insulating an agricultural locus at temperatures suitable for the growth of plants.

Examples of conventional covering materials for agricultural houses, tunnel houses and the like are vinyl chloride resin films such as polyvinyl chloride films and olefinic resin films such as films of polyethylene or an ethylene/vinyl acetate copolymer. The olefinic resin films are superior to the vinyl chloride resin films in that they are chemically stable and their light transmittance scarcely changes during a long-term use. The vinyl chloride films, in spite of various defects, gain widespread acceptance because they have better thermal insulating properties than the olefinic resin films. Nevertheless, their thermal insulating properties in cold climate is not entirely satisfactory, and covering materials having better thermal insulating properties have been desired.

The thermal insulating property of a covering film or sheet structure denotes its property of preventing a decrease in the inside temperature of a large-sized agricultural house, tunnel house or the like covered with the covering film or sheet, especially at night. The heat from the sunlight which has been absorbed in the soil within the house during the daytime is irradiated at night as radiant rays from the ground surface, thereby to maintain the inside of the house at a higher temperature than the temperature of the outer atmosphere. If the covering film or sheet structure has a high transmittance of radiant rays from the surface of the ground within the house, the radiant rays dissipate out of the house, and the ground temperature within the housing decreases. Consequently, the inside temperature of the house cannot be maintained at a higher temperature than the outer atmosphere. Accordingly, the thermal insulating property of the covering film or sheet structure is better when it reflects or absorbs radiant rays to a higher degree from the ground surface at night.

In Japanese Patent Application No. 22468/76 (laid open on Sept. 6, 1977) whose inventorship includes some of the coinventors of the present application and which was laid open after the filing of a Japanese Patent Application corresponding to the present application, the inventors disclose that a resin composition comprising 100 parts by weight of a thermoplastic olefinic resin and 1 to 20 parts by weight of an acetal resin serves to improve the thermal insulating property of a film or sheet prepared from it.

In the earlier application cited above, the thermal insulating property of the film or sheet increases with increasing amount of the acetal resin. However, its strength required of a covering material is reduced, and particularly, its poor abrasion resistance leads to the breakage of the film upon frictional contact with the framework of an agricultural house. It is impossible therefore to add the acetal resin in an amount of more than 20 parts by weight per 100 parts by weight of the olefinic resin. Thus, a covering film having satisfactory strength and thermal insulating properties is difficult to prepare from such a resin composition.

The present inventors have now found that the acetal resin can be incorporated in an amount of up to about 40 parts by weight per 100 parts by weight of the olefinic resin, and a covering multilayer film or sheet structure for agricultural application having improved thermal insulating properties and a satisfactory strength can be prepared from such a resin composition.

It has also been found that the multilayer film or sheet has improved surface gloss and heat-sealability which cannot be achieved by the prior art films or sheets.

It is an object of this invention therefore to provide a covering multilayer film or sheet structure useful for agricultural purposes which has improved thermal insulating properties, satisfactory strength, superior surface gloss and superior heat-sealability.

Another object of this invention is to provide a method for maintaining a particular agricultural locus at temperatures suitable for the growth of plants, especially crops, by utilizing such a covering multilayer film or sheet structure.

The above and other objects and advantages of this invention will become apparent from the following description.

The covering multilayer film or sheet structure useful for agricultural application consists essentially of (1) a film or sheet of a resin composition comprising (A) 100 parts by weight of a thermoplastic resin selected from the group consisting of olefinic resins and vinyl chloride resins and (B) about 1 to about 40 parts by weight, preferably about 10 to about 30 parts by weight, of an acetal resin, and (2) a layer of the thermoplastic resin (A) laminated to at least one surface of the film or sheet (1).

Examples of the thermoplastic olefinic resin (A) include homopolymers or copolymers of α-olefins and copolymers of α-olefins with other comonomers copolymerizable therewith. Specific examples are low-density polyethylene, medium-density polyethylene, high-density polyethylene, polypropylene, an ethylene/propylene copolymer, an ethylene/butylene copolymer and an ethylene/vinyl acetate copolymer. Chlorinated polyethylene, chlorinated polypropylene, an ethylene/acrylic acid copolymer, and ethylene/methacrylic acid copolymer, and blends of these and aforesaid resins can also be used. Among these, ethylene resins, especially low-density polyethylene and an ethylene/vinyl acetate copolymer, are preferred because they can afford films or sheets having better transparency and suppleness than the other thermoplastic olefinic resins at lower costs. The ethylene/vinyl acetate copolymer is especially preferred because it has superior thermal insulation and does not easily permit the adhesion of water droplets. Conveniently, the copolymer has a vinyl acetate content of about 5 to about 20% by weight.

Polyvinyl chloride is a typical example of the vinyl chloride resin (A). Any film-forming vinyl chloride resin can be used in this invention.

Suitable acetal resins (B) are polyoxymethylene polymers or copolymers having polyoxymethylene units of the formula $-(-HCHO-)-$. Examples are polyformaldehyde (termed an acetal homopolymer) which is regarded as a polymer of formaldehyde and an acetal copolymer resulting from the copolymerization of ethylene oxide or dioxane with polyoxymethylene. The copolymers may be block or graft copolymers which have a polyoxymethylene chain as the main chain or side chain of the molecules and the remainder of the molecule comprising ethylene, ethylene/vinyl acetate, ethylene/vinyl chloride, ethylene/vinyl chloride/vinyl acetate, ethylene/acrylic acid, ethylene/acrylate ester, acrylate ester, ethylene oxide, propylene oxide, propylene, butadiene or vinyl chloride.

Preferred acetal resins have a degree of polymerization of about 500 to about 3,500, especially about 2,000 to about 3,500. Especially preferred are those in which up to about 3% by weight, for example 1 to 3% by weight, of a comonomer such as ethylene oxide is copolymerized in the polyoxymethylene molecules. If the degree of polymerization of the acetal resin is below about 2,000, especially below about 500, its viscosity becomes low, and uniform mixing of it with the thermoplastic resin (A) is difficult. On the other hand, if the degree of polymerization is above 3,500, the melting point of the acetal resin (B) becomes too high. Hence, the resulting resin composition is difficult to shape, and the thermoplastic resin (A) is likely to decompose during film or sheet formation. Inclusion of a comonomer such as ethylene oxide is preferred because the acetal resin (B) becomes chemically and thermally stable. Especially preferred acetal resins are those having terminal carboxyl groups.

According to one preferred embodiment of this invention, there is provided a covering multilayer film or sheet structure for agricultural application which consists essentially of (1) a film or sheet of a resin composition comprising (A) 100 parts by weight of a thermoplastic resin selected from the group consisting of ethylene resins, especially low-density polyethylene, an ethylene/vinyl acetate copolymer or a mixture thereof, and vinyl chloride resins and (B) about 1 to about 40 parts by weight of a polyoxymethylene polymer or copolymer preferably containing up to about 3% by weight of a comonomer, and (2) a layer of the thermoplastic resin (A) laminated to at least one surface of the film or sheet (1).

When an olefinic resin is used as the resin (A) in the resin composition of this invention composed of the resins (A) and (B), the resin (A) to be laminated is preferably the same or different olefinic resin. When a vinyl chloride resin is selected as the resin (A) in the composition, the resin (A) to be laminated is preferably the same or different vinyl chloride resin.

In the multilayer film or sheet structure of this invention, the resin composition of (A) and (B) and the resin layer (A) to be laminated to a film or sheet of the aforesaid resin composition may contain various additives.

When an olefinic resin is selected as the resin (A), examples of the additives are surface-active agents for imparting the property of flowing down the dew formed on the inside surface of an agricultural house, such as pentaerythritol fatty acid esters; ultraviolet absorbers for increasing weatherability, such as 2-(2'-hydroxy-5'-methylphenyl)penzotriazole; and antioxidants for inhibiting thermal degradation by outdoor exposure, such as butylated hydroxytoluene.

The amounts of these additives are optionally determined, but generally are about 0.2 to about 2.0% by weight for the surface-active agents; about 0.05 to about 0.5% by weight for the ultraviolet absorbers; and about 0.01 to about 0.1% by weight for the antioxidants, all based on the weight of the resin (A).

When a vinyl chloride resin is selected as the resin (A), examples of suitable additives are plasticizers such as dioctyl phthalate or dibutyl phthalate; heat stabilizers such as barium stearate and di-n-octyl tin compounds; ultraviolet absorbers such as 2-hydroxy-4-n-octoxybenzophenone or 2-(2'-hydroxy-5'-methylphenyl)benzotriazole; lubricants such as stearic acid and palmitic acid; and surface-active agents such as a stearic acid ester of pentaerythritol.

The amounts of these additives can be properly chosen. For example, the amounts are about 2 to about 50 parts for the plasticizers (in particular, about 2 to about 5 parts by weight in the case of a hard vinyl chloride resin, and about 30 to about 50 parts by weight in the case of a soft vinyl chloride resin) per 100 parts by weight of the vinyl chloride resin; about 1.0 to about 3.0% by weight for the heat stabilizer based on the weight of the resin (A); about 0.05 to about 0.5% by weight for the ultraviolet absorbers based on the weight of the resin (A); about 0.5 to about 2.0% by weight for the lubricants based on the weight of the resin (A); and about 0.5 to about 2.0% by weight for the surface-active agents based on the weight of the resin (A).

The content of the resin (B) in the composition of (A) and (B) is optionally determined according to the use of the agricultural covering structure. It is added in an amount of at least 1 part by weight per 100 parts by weight of the thermoplastic resin (A). If the amount is less than 1 part by weight, the effect of thermal insulation of the covering material is not satisfactory. With increasing amount of the acetal resin (B), the thermal insulating properties of the resulting covering material increase. But if it exceeds 40 parts by weight, the resulting multilayer film or sheet structure becomes hard and brittle, lacks suppleness and also has reduced strength properties such as abrasion resistance. Moreover, such a multilayer film or sheet structure has reduced transparency. Accordingly, when the resulting film or sheet structure is intended for use as an outer covering of an agricultural house, the amount of the acetal resin (B) is preferably 1 to 40 parts by weight, especially 10 to 30 parts by weight, per 100 parts by weight of the thermoplastic resin (A). When the amount of the acetal resin (B) is larger, a thinner but thermally insulating covering material for agriculture can be obtained.

When the final multilayer film or sheet structure is intended for uses which require thermal insulation but do not strictly require strength and transparency, for example, as a covering material for tunnel houses within an agricultural house, a heat insulating covering material for covering agricultural houses or turnnel houses only at night, or a mulching material or covering material for growing rice plant seedlings, the amount of the acetal resin (B) is at least 20 parts by weight, preferably 30 to 40 parts by weight, per 100 parts by weight of the resin (A).

The layer (1) of the composition comprising the resins (A) and (B) may be discontinuous, for example in the form of discontinuous patterns such as fringes or lattices. When the layer (1) of the composition is discontinuous, the transparency of the resin (A) layer is secured, and the multilayer film or sheet structure as a whole is pliable. Thus, even when the amount of the acetal resin (B) is about 40 parts by weight, the resulting film or sheet structure can be used as an outer covering of agricultural houses.

In the covering multilayer film or sheet structure of the present invention, the resin (A) layer (2) to be laminated to the film or sheet (1) of the composition comprising the resins (A) and (B) is provided on one or both surfaces of the film or sheet (1). In an especially preferred embodiment, the resin (A) layer (2) is formed on both surfaces. In this embodiment, it is possible to use an ethylene/vinyl acetate copolymer having a high vinyl acetate content as the thermoplastic resin in the interlayer. This copolymer cannot be used as a surface layer because of its adhesiveness, but has good compatibility with the acetal resin. Moreover, characteristics required of agricultural covering materials can be easily imparted to such a three-layer film or sheet structure. For example, a surface-active agent for preventing the condensation of water droplets may be incorporated in that layer of the film or sheet structure which is to be the innermost layer of an agricultural house covering. Or a light absorber may be incorporated in the outermost layer to impart weatherability.

The covering multilayer film or sheet structure of this invention can be prepared by various methods, for example by separately forming the film or sheet (1) of the composition comprising the thermoplastic resin (A) and the acetal resin (B) and the resin (A) layer (2) by an extrusion molding method (e.g., inflation, or T-die method) or a calender method and then consolidating them into a laminate film or sheet by a dry laminate method or a heat laminate method; or by extrusion-laminating one layer onto the other; or by forming a laminate film in a single step by a multilayer extrusion method. The multilayer extrusion method is preferred since the film formation is easy and a film having superior adhesion strength and transparency can be obtained.

The thickness of the film or sheet (1) of the resin composition is determined properly according, for example, to the thermal insulating property required of the final covering structure and the content of the acetal resin (B). Smaller thicknesses of the film or sheet (1) of the resin composition are economically more advantageous if its strength and transparency are not impaired. Preferably, the content of the acetal resin (B) should be increased as much as possible. When the content of the acetal resin (B) is as large as 20 to 30 parts by weight, the thickness is usually about 0.02 to 0.05 mm. The base resin layer (2) should have a sufficient thickness that can impart sufficient strength as a covering material to the layer (1) of the resin composition comprising the resins (A) and (B). When the content of the acetal resin (B) is relatively small, the thickness may be very small. On the other hand, when the acetal resin content is as high as 20 to 30 parts by weight, the thickness may be about the same as that of the film or sheet (1) of the resin composition comprising resins (A) and (B).

Each of the layers of the film or sheet structure may be a foamed sheet layer with a thickness of about 1 to 3 mm. Specifically, at least one of the film or sheet (1) of the resin composition comprising the resin (A) and (B) and the resin (A) layer (2) may be in the foamed state. The multilayer film or sheet structure containing a foamed layer is used as a thermal insulating covering material which does not require a high degree of light transmission.

A foamed film or sheet may be prepared, for example, by a method which comprises melt-kneading resin (A) with a heat-decomposable blowing agent such as an azo-type chemical blowing agent at a temperature at which the blowing agent does not decompose, extruding the mixture to form pellets, feeding the pellets and resin (B) into an extruder, and melt-extruding the mixture at a temperature at which the blowing agent decomposes, thereby to form a foamed film or sheet; or a method which comprises mixing resins (A) and (B), feeding the mixture into an extruder, continuously forcing a liquefied gas such as butane at a fixed rate into the extruder through an opening in it during the melt-extruding step, and further kneading and extruding the mixture. The base resin (A) layer (2) is laminated to the resulting foamed film or sheet, or is extrusion-laminated during the foaming-extruding step, thereby to form the foamed film or sheet structure of the invention. A method is also available which involves preparing a foamed film or sheet of the thermoplastic resin (A) not containing the acetal resin (B), and laminating a layer of the thermoplastic resin containing the acetal resin (B) to the foamed film or sheet.

According to this invention, there is provided a method for maintaining an agricultural locus at temperatures suitable for the growth of plants, which comprises covering the locus with a covering multilayer film or sheet structure consisting essentially of (1) a film or sheet of a resin composition comprising (A) 100 parts by weight of the thermoplastic resin and (B) about 1 to about 40 parts by weight of the acetal resin, and (2) a layer of the thermoplastic resin (A) laminated to at least one surface of the film or sheet (2).

The agricultural locus, as referred to in the present application, is a locus where plants are being grown or will be grown. It should be understood that this locus includes the one where the terrestrial portion of a plant does not appear but its bulbs, roots or seeds are present.

The following Examples illustrate the present invention.

EXAMPLE 1

A mixture (X) consisting of 100 parts by weight of low-density polyethylene (Yukalon YE-30, a trademark for a product of Mitsubishi Petrochemical Co., Ltd.; MI=1.0) and 24 parts by weight of polyacetal (Duracon M-270, a trademark for a product of Polyplastics Co., Ltd.; MI=27) was fed into one extruder of a two-layer inflation extrusion apparatus. A mixture (Y) consisting of 100 parts by weight of the same low-density polyethylene as described above and 1 part by weight of pentaerythritol monostearate as a surface-active agent was fed into the other extruder. These mixtures were kneaded at 200° to 210° C., and formed into a two-layer film with a thickness of 0.1 mm. The ratio of the thickness of the layer composed of mixture (X) to that of the layer composed of mixture (Y) was adjusted to about 1:1. The resulting film had much the same transparency as a film of the low-density polyethylene alone, and had sufficient strength and suppleness as a covering film.

EXAMPLE 2

A mixture ($X_1$) consisting of 100 parts by weight of an ethylene/vinyl acetate copolymer (Evaflex V-501, a trademark for a product of Mitsui Polychemical Co., Ltd.; MI=1.5, vinyl acetate content 14.5%) and 28 parts by weight of the same polyacetal as used in Example 1 and a mixture ($Y_1$) consisting of 100 parts by weight of the same ethylene/vinyl acetate copolymer and 1 part by weight of the same surface-active agent as used in Example 1 were processed in the same way as in Example 1 to afford a two-layer film having a thickness of 0.05 mm with the ratio of thicknesses of the both layers being 1:1. The film obtained had much the same transparency as a film of the ethylene/vinyl acetate copolymer alone, and had sufficient strength and suppleness as a covering film.

EXAMPLE 3

The same ethylene/vinyl acetate copolymer as used in Example 2 ($Y_2$), a mixture ($X_2$) of 100 parts by weight of this copolymer and 30 parts by weight of the same polyacetal as used in Example 1, and a mixture ($Y_3$) of 100 parts by weight of the above copolymer and 1.5 parts by weight of the same surface-active agent as used in Example 1 were fed into a three-layer inflation extrusion apparatus including three extruders in such a manner that the mixture ($X_2$) would form an interlayer of the final product. These mixtures were kneaded at 200° to 210° C. and formed into a three-layer film having a thickness of 0.1 mm with the ratio of the thicknesses of the three layers being 1:1:1. The film had much the same transparency as a film of the ethylene/vinyl acetate copolymer alone, and had sufficient strength and suppleness as a covering film.

EXAMPLE 4

A mixture ($Y_4$) consisting of 100 parts by weight of an ethylene/vinyl acetate copolymer (Evaflex P-0803, a trademark for a product of Mitsui Polychemical Co., Ltd.; MI=1.7, vinyl acetate content 8%) and 0.5 part by weight of hydroxybenzophenone as a light absorber, a mixture ($Y_5$) consisting of 100 parts by weight of the same ethylene/vinyl acetate copolymer and 0.5 part by weight of the same surface-active agent as used in Example 1, and a mixture ($X_3$) consisting of 100 parts by weight of an ethylene/vinyl acetate copolymer (Evaflex 460, a trademark for a product of Mitsui Polychemical Co., Ltd.; MI=2.5, vinyl acetate content 19%) and 16 parts by weight of the same polyacetal as used in Example 1 were processed in the same way as in Example 3 to form a three-layer film having a thickness of 0.1 mm and containing the mixture ($X_3$) as an interlayer with the ratio of the thicknesses of the three layers being 1:2:1. The resulting film was pliable and had good transparency and superior abrasion resistance. When it was used as a covering material with the layer composed of the mixture ($Y_4$) facing outwardly of an agricultural house, it showed good watherability. Moreover, the inside layer of the film did not permit adhesion of water droplets. The film could be heat-sealed in a connecting operation.

Agricultural houses were built by using the films obtained in Examples 1 to 4 as covering materials. The air temperature and the temperature of the ground (measured at a position 5 cm below the ground surface) within each house were measured. The results are shown in Table 1.

For comparison, similar agricultural houses were built by using a polyethylene film having a thickness of 0.1 mm (Comparative Example 1), a 0.1 mm-thick film of an ethylene/vinyl acetate copolymer (Comparative Example 2), a 0.1 mm thick polyvinyl chloride film (Comparative Example 3), a 0.1 mm thick film prepared by mixing the same low-density polyethylene, polyacetal and surface-active agent as used in Example 1 in a weight ratio of 100:12:0.5 (the amount of the polyacetal was the same as in Example 1) and extruding molding the mixture (Comparative Example 4), and a 0.1 mm thick film prepared by mixing the same ethylene/vinyl acetate copolymer, polyacetal and surface-active agent as used in Example 2 (the amount of the polyacetal was the same as in Example 2) in a weight ratio of 100:7:0.5 and extrusion-molding the mixture (Comparative Example 5), which were covering films known heretofore. The air temperatures and the ground temperatures within the houses were measured in the same way, and the results are shown in Table 1.

TABLE 1

| Film sample | Transmittance of infrared rays (%) | Temperature of the inside of the house (°C.) | | | |
|---|---|---|---|---|---|
| | | 1:00 a.m. | | 6:00 a.m. | |
| | | Air temperature | Ground temperature | Air temperature | Ground temperature |
| Example 1 | 9 | −2.2 | 1.9 | −3.0 | 1.4 |
| Example 2 | 5.5 | −2.0 | 2.1 | −3.0 | 1.9 |
| Example 3 | 3.0 | −1.6 | 2.1 | −2.7 | 1.9 |
| Example 4 | 4.2 | −1.8 | 2.1 | −2.8 | 1.9 |
| Comparative Example 1 | 80 | −3.0 | 1.0 | −4.5 | 0 |
| Comparative Example 2 | 35 | −2.4 | 1.6 | −3.6 | 1.0 |
| Comparative Example 3 | 5 | −2.0 | 2.1 | −3.0 | 1.8 |
| Comparative Example 4 | 9 | −2.2 | 1.9 | −3.1 | 1.4 |
| Comparative Example 5 | 5.5 | −2.0 | 2.0 | −3.0 | 1.9 |

The above temperatures were measured at Minakuchi, Shiga Prefecture, Japan in February 1977. At 6:00 a.m. on the day of measurement, the atmospheric temperature was −5.0° C. and the ground temperature was −1.0° C.

The transmittance of infrared rays in Table 1 was that of infrared rays having a wavelength of 9 to 11 microns. The mechanism of thermal insulation of the agricultural houses an night is that the covering film reflects and absorbs radiant rays from the soil within the house and thus prevents the radiant rays from dissipating out of the house. The radiant rays from the ground surface have a wavelength in the range of 5 to 20 microns, and their radiant energy becomes maximum at a wavelength of 9 to 11 microns. Hence, the thermal insulation of the covering film is better when the transmittance of radiant rays within this wavelength region is lower.

The results in Table 1 show that when the covering material of this invention is used, the air temperature and ground temperature within the house are higher than in the case of using the conventional olefinic resin films (Comparative Examples 1 and 2). In particular, a comparison of it with the low-density polyethylene film (Comparative Example 1) shows that the air temperature within the house covered by the present invention was 0.8°–1.8° C. higher between 1:00 a.m. and 6:00 a.m. This indicates the superior thermal insulation of the covering film or sheet structure of the present invention. Although the differences in the temperature of the inside of the house according to the differences in the type of the covering film are slight, the temperature at dawn is higher even slightly, the difference in temperature in a given day increases greatly. Thus, the difference becomes great in the integrated temperature (the average temperature of one day multiplied by the number of days) in the course of growth crops, and greatly affects the amount and time of harvest of crops.

A comparison of Example 2 with Comparative Example 5 shows that the thickness of the film in Example 2 is 0.05 mm and the thickness of the film of Comparative Example 5 was 0.1 mm, but the air temperature and the ground temperature within the house are much the same for both, and thus no appreciable difference is seen in thermal insulating properties. It is seen therefore that a thicker film having superior thermal insulating properties can be obtained by the present invention.

Furthermore, the covering films of these Examples had much the same transparency and suppleness as the olefinic resin film, and the surface of the resin (A) layer (1) had the same gloss and heat-sealability as the conventional films. The film or sheet structure of the invention further had better handleability and appearance than a film consisting of a single layer of a composition of an olefinic resin and an acetal resin (Comparative Examples 4 and 5).

EXAMPLE 5

Polyvinyl chloride (the degree of polymerization 1000)—100 parts by weight
Dioctyl phthalate—45 parts by weight
Calcium stearate—0.5 parts by weight
Zinc stearate—0.5 parts by weight
Epoxidized soybean oil—1.0 parts by weight
Surface-active agent—2.0 parts by weight A mixture ($Y_5$) of the above formulation and a mixture ($X_4$) obtained by adding 9 parts by weight of polyacetal (Duracon M-25-01, a trademark for a product of Polyplastics Co., Ltd.; MI=2.5) to the mixture ($Y_5$) were fed into separate extruders, and extruded from a two-layer T-die to make a laminate film having a thickness of 0.1 mm with the ratio of the thicknesses of the two layers being 1:1. The laminate film had a transmittance of infrared rays with a wavelength of 9 to 11 microns of 1.4%, which was lower than those of the films obtained in the foregoing Examples and Comparative Examples. The film obtained by this Example had sufficient strength and good surface gloss and heat-sealability.

EXAMPLE 6

A laminate film having a thickness of 0.1 mm with the ratio of the thicknesses of the two layers being 1:1 was prepared by operating in the same way as in Example 2 except that the amount of the polyacetal blended was increased to 38 parts by weight. The film was white and had a low light transmittance. But because of its good thermal insulating property, it could be used in applications which did not strictly require transparency and strength.

As described hereinabove, the agricultural covering material of this invention results from the lamination of a thermoplastic resin base layer to at least one surface of a film or sheet of a resin composition consisting of a thermoplastic resin such as an olefinic resin or vinyl chloride resin and an acetal resin. The inclusion of the acetal resin makes the resulting film or sheet structure superior in thermal insulating properties. Since the acetal resin-incorporated layer is reinforced with the base layer of the thermoplastic resin, the proportion of the acetal resin to be incorporated can be increased. The resulting covering material is thin and has superior thermal insulating properties. Moreover, the lamination of the base layer leads to the improvement of the surface gloss and heat-sealability of the acetal resin-incorporated layer. Thus, the resulting covering film or sheet structure has the same appearance than conventional covering materials and can be handled in the same way as in the case of the conventional covering materials.

What we claim is:

1. A method for maintaining an agricultural locus at temperatures suitable for the growth of plants, which comprises covering the locus with a covering multilayer film or sheet structure for agricultural application, which consists essentially of (1) a film or sheet of a resin composition comprising (A) 100 parts by weight of a thermoplastic resin selected from the group consisting of polyethylene, ethylene/vinyl acetate copolymer, mixtures thereof, and vinyl chloride resins and (B) about 1 to about 40 parts by weight of an acetal resin having a degree of polymerization of about 500 to about 3,500 and selected from the group consisting of polyoxymethylene polymer and polyoxymethylene copolymer containing up to 3% by weight of a comonomer, and (2) a layer of the thermoplastic resin (A) laminated to at least one surface of the film or sheet (1).

2. The method of claim 1 wherein at least one of the film or sheet (1) and the resin (A) layer (2) is in the foamed state.

3. The method of claim 1 wherein the polyethylene is low density polyethylene.

4. The method of claim 1 wherein the ethylene/vinyl acetate copolymer has a vinyl acetate content of 5 to 20%.

* * * * *